July 17, 1956 E. L. C. WHITE 2,755,335

APPARATUS FOR INTERSPERSING PULSES IN ELECTRICAL SIGNALS

Filed Aug. 31, 1949

Inventor
ERIC LAWRENCE CASLING WHITE
By Ralph E. Atherton
Attorney

United States Patent Office 2,755,335

Patented July 17, 1956

2,755,335

APPARATUS FOR INTERSPERSING PULSES IN ELECTRICAL SIGNALS

Eric Lawrence Casling White, Richings Way, Iver, England, assignor to Electric & Musical Industries Limited, Hayes, England, a company of Great Britain Application August 31, 1949, Serial No. 113,300

Claims priority, application Great Britain September 11, 1948

5 Claims. (Cl. 178—7.1)

This invention relates to apparatus for interspersing pulses in electrical signals, such for example as video signals generated in television transmitting equipment.

In one form of television transmitting equipment the video signals have the signal level corresponding to black established at a datum level before the synchronising pulses are interspersed with the video signals. It is desirable, in order to reduce the possibility of waveform distortion, to carry out the necessary suppression of the video signals, and the introduction of the synchronising pulses into the output channel of the equipment with the minimum of components and with the use of conductive connections as far as possible.

The object of the present invention is to provide improved apparatus with a view to enabling the above-mentioned desideratum to be achieved.

Another object of the present invention is to provide apparatus for interspersing pulses in electrical signals (e. g. television video signals) comprising an output impedance, a first switch effectively arranged in series between the source of said signals and said impedance, a second switch effectively arranged in series between a source of voltage and said impedance and means for periodically rendering said first switch non-conducting and said second switch conducting and vice versa, so that in operation said impedance alternately receives said signals via said first switching device and pulses determined in amplitude by said source of voltage via said second switching device.

Figure 1:
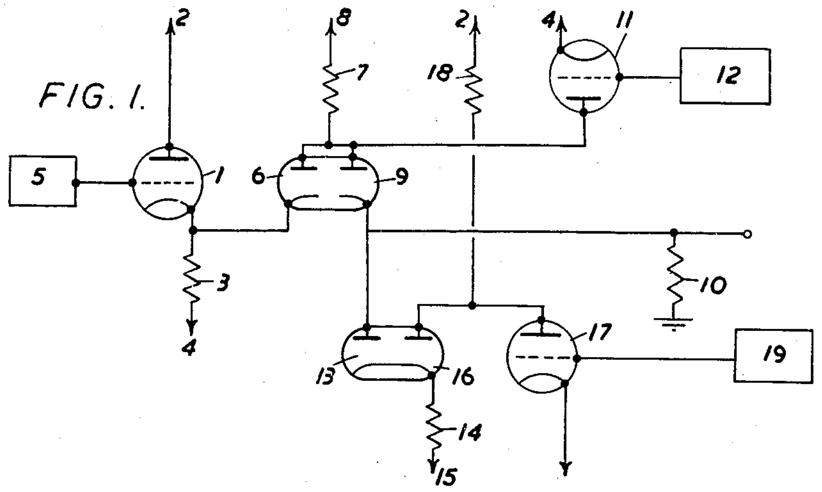
Figure 2:
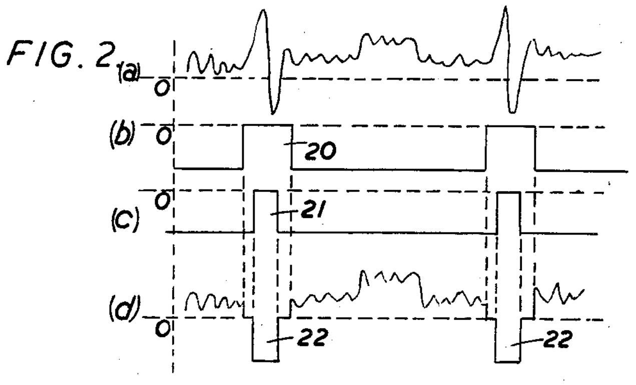
Figure 3:
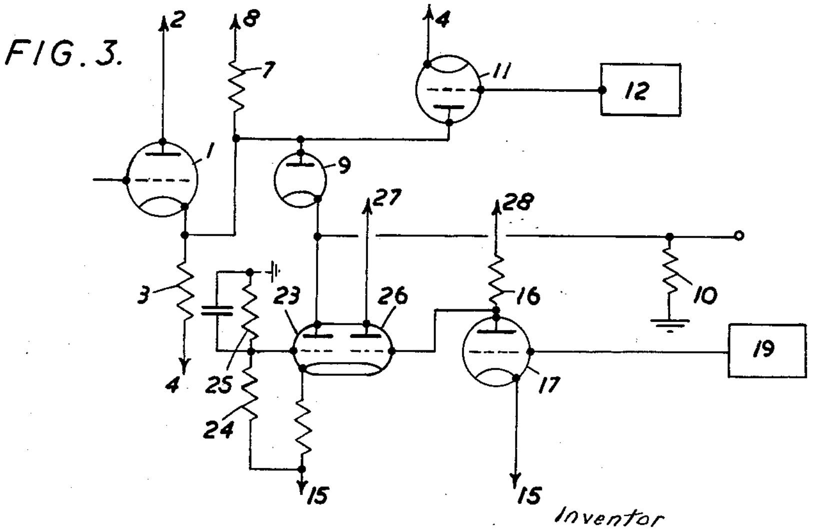

In order that the said invention may be clearly understood and readily carried into effect, the same will now be more fully described with reference to the accompanying drawing, in which:

Figure 1 illustrates diagrammatically and partly in block form apparatus according to one example of the present invention applied to television transmitting equipment, Figure 2 illustrates waveforms explanatory of the operation of Figure 1, and Figure 3 illustrates a modification of the apparatus shown in Figure 1.

Referring to the drawing, the apparatus illustrated in Figure 1 comprises a cathode follower valve 1 which is shown as a triode, having its anode connected to a suitable source of potential of say 300 volts positive and indicated by the arrow 2 and having its cathode connected by a resistance 3 to a source of potential 4 of say 150 volts negative. The control electrode of the valve 1 is connected to the video signal channel of the television transmitting equipment, which is indicated diagrammatically in block form at 5. A portion of the video-signal waveform is indicated in Figure 2 (*a*) and it will be assumed that the video signals are applied to the control electrode in such sense that a positive potential excursion represents an increase in the brightness of the scene televised, and that the signals have previously had the signal level corresponding to black adjusted to a datum level such that at the cathode of the valve 1 black corresponds to earth potential or a potential slightly positive relative thereto. The cathode of the valve 1 is conductively connected to the cathode of a diode valve 6 whose anode is connected via a resistance 7 to a positive potential source 8 the resistance 7 being of relatively large value compared with the resistance of the diode 6. A second diode valve 9 is arranged with its anode conductively connected to the anode of the diode 6 and with its cathode conductively connected to one terminal of a load resistance 10 whose other terminal is earthed, the valve 9 forming a switching device effectively in series with the resistance 10. The anodes of the diodes 6 and 9 are connected to the anode of a further valve 11, shown as a triode, whose cathode is connected to a source of negative potential, in this example the source 4, and whose control electrode is connected to the source of the suppression pulses utilised in the equipment, the latter source being indicated in block form at 12. The control electrode of the valve 11 is negatively biassed so that the valve 11 is normally non-conducting and under this condition the potential source 8 maintains the diodes 6 and 9 conducting. The suppression pulses are applied in positive sense as indicated by the waveform (*b*) in Figure 2 and render the valve 11 conducting for the duration of each suppression pulse, and the negative potential applied to the cathode of the valve 11 from the source 4 is such that when the valve 11 is rendered conducting the potential at the anodes of the diodes 6 and 9 is lowered below earth potential so that the diodes are rendered non-conducting. Only a fraction of the suppression pulse waveform is indicated in Figure 2 (*b*) but it comprises line suppression pulses and interspersed frame suppression pulses arranged according to the television system for which the equipment is intended.

A further diode valve 13 has its anode conductively connected to the load resistance 10 and the cathode of the valve 13 is connected via a resistance 14 to a source of negative potential 15. The cathode of the diode 13 is conductively connected to the cathode of a further diode 16 whose anode is conductively connected to the anode of a valve 17, shown as a triode, and is connected via a suitable resistance 18 to the potential source 2. The cathode of the valve 17 is connected to the aforesaid negative potential source 15 and its control electrode is so biassed that the valve 17 is normally non-conducting. When the valve 17 is non-conducting, the potential at the anode of the diode 16 maintains the diode 16 conducting, and the potential at the cathode of the diodes 16 and 13 is then sufficiently high to maintain the diode 13 non-conducting. The control electrode of the valve 17 is connected to a source of switching pulses, the last-mentioned source being indicated in block form at 19, and switching pulses, as indicated by the waveform *c* in Figure 2, are applied in positive sense so as to render the valve 17 conducting for the duration of each pulse. Only a fraction of the switching pulse waveform is shown in Figure 2 (*c*) but like the suppression pulse waveform it comprises line and frame switching pulses, the intervals during which the switching pulses occur always lying wholly within intervals during which suppression pulses occur. Therefore each time the valve 17 is rendered conducting the valve 9 is already non-conducting with the result that no signal is present across the load resistance 10 and the potential at the cathode of the diode 9 and hence at the anode of the diode 13 is nearly earth potential. When the valve 17 is rendered conducting, the fall in potential at the anode of the diode 16 renders the diode 16 non-conducting and the consequent fall in potential at the cathodes of the diodes 13 and 16 below earth potential renders the diode 13 conducting.

It will be observed, therefore, that the anode-cathode paths of the diodes 9 and 13 are included in separate signal paths to the resistance 10 from the cathode of the valve 1 and from the potential source 15 respectively. When the valve 11 is non-conducting, the diodes 6 and 9 being conducting, the video-signal waveform is transmitted from the cathode of valve 1 to the anode of the diode 6 and thence via the diode 9 to the resistance 10 with little attenuation, the resistance 10 being for example of the order of five times the resistance of the diode 9 when conducting. The diode 9 therefore constitutes a switch connected in series between a source of the video signals, namely the anode of the diode 9, or the cathode of the valve 1 if the diode 9 is omitted as described hereinafter. When the diode 9 is rendered non-conducting, on the occurrence of a suppression pulse such as the pulse 20 in Figure 2 (*b*), the transmission of the video signals to the resistance 10 is discontinued and the potential across the resistance 10 becomes zero, until a switching pulse occurs such as the pulse 21 in Figure 2 (*c*) and the diode 13 is rendered conducting. A negative potential pulse is thereupon set up across the resistance 10, the amplitude of the pulses being determined to a high degree of accuracy by the potential of the source 15 and the value of the resistances 10 and 14. It is of course essential that the potential at the anode of the diode 9, during suppression pulses, is lower than the potential at the anode of the diode 13 during switching pulses. When the pulse 21 ends, the potential across the resistance 10 again becomes zero until the suppression pulse 20 ends whereupon the transmission of video signals to the resistance 10 recommences. In this way suppression of the video signals from time to time and the interspersing of the potential pulses is effected, the pulses being synchronised with the pulses from the source 19 and serving as synchronising pulses in the output waveform. A fraction of the output waveform across the resistance 10 is indicated in Figure 2 (*d*), two synchronising pulses being shown at 22.

Owing to the capacity of the diodes 9 and 13, the suppression and switching pulses, if of large amplitude, may cause "whiskers" to appear in the output waveform and in practice therefore it is found desirable for the resistances 7 and 14 to be of fairly low value, for example, 2,000 ohms for a 405 line television system, the resistance 10 being in that case also 2,000 ohms. In this case the effective potentials applied to resistances 7 and 14 from the sources 8 and 15 should be about +20 volts and −20 volts respectively. In the modification of the invention illustrated in Figure 3, the diode valve 13 is replaced by a triode valve 23 to aid in suppressing the occurrence of such "whiskers" as referred to above, the control electrode of the valve 23 being returned to earth through a suitable negative potential source, which may be derived from the source 15 by potential divider 24, 25 whereby the anode of the valve 23 is capacitatively screened from the cathode. The diode valve 16 is also replaced, in this modification, by a triode valve 26 whose control electrode is connected to the anode of the valve 17, the anodes of the valves 26 and 17 being connected to suitable potential sources 27 and 28 such that the valve 26 is maintained conducting except when a switching pulse is applied from the source 19. The diode valve 6 is dispensed with in this modification. The employment of a diode 6, as shown in Figure 1 is however preferred, since it serves to impose a sharp limit to the positive (i. e. white) excursions of the video signals during the non-suppression periods, thus reducing the possibility of overloading subsequent amplifiers. The other parts in Figure 3 are similar to those in Figure 1 and are denoted by the same reference numerals.

The valves 6 and 9, 13 and 16, and 23 and 26 which are respectively shown as having a common envelope, may of course be provided in separate envelopes.

What I claim is:

1. Apparatus for interspersing pulses in electrical signals, said apparatus comprising a source of electrical signals, a source of a substantially fixed voltage, an output load, a signal path from said first source to said load including a first unilaterally conductive device having an anode electrode and a cathode electrode and having its anode-cathode path in series with said first source and said load, a separate signal path from said second source to said load including a second unilaterally conductive device having an anode electrode and a cathode electrode and having its anode-cathode path in series with said second source and said load, means for rendering said first unilaterally conductive device alternately conducting and non-conducting, and other means for rendering said second unilaterally conductive device alternately nonconducting and conducting, whereby said load alternately receives signals via said first path and pulses determined in amplitude by said source of voltage via said second path.

2. Apparatus for interspersing pulses in electrical signals, said apparatus comprising a source of electrical signals, a source of a substantially fixed voltage, a load resistor connected at one end to a point of datum voltage, a switch having a conducting state and a nonconducting state connected from said first source to the other end of said load resistor, a unilaterally conductive device having only an anode electrode and a cathode electrode, a further resistor having one end connected to said second source, said unilaterally conductive device having its anode connected to the other end of one of said resistors and having its cathode connected to the other end of the other of said resistors, means for rendering said switch alternately conducting and non-conducting, and other means for rendering said unilaterally conductive device alternately nonconducting and conducting, whereby said load resistor alternately receives signals via said switch and pulses of determined amplitude via said unilaterally conductive device.

3. Apparatus for interspersing pulses in electrical signals, said apparatus comprising a source of electrical signals, a source of a substantially fixed voltage, a load resistor connected at one end to a point of datum voltage, a switch having a conducting state and a nonconducting state connected from said first source to the other end of said load resistor, a unilaterally conductive device having an anode electrode, a control electrode and a cathode electrode, means grounding said control electrode for alternating current, a further resistor having one end connected to said second source, said unilaterally conductive device having its anode connected to the other end of one of said resistors and its cathode connected to the other end of the other of the resistors, and means for rendering said switch alternately conducting and nonconducting and said unilaterally conductive device nonconducting and conducting, whereby said load resistor alternately receives signals via said switch and pulses of determined amplitude via said unilaterally conductive device.

4. In television apparatus including a source of television video signals having signals corresponding to black stabilized at a datum voltage, means for interspersing synchronizing pulses in said video signals, said means comprising an output load connected at one end to a point of said datum voltage, a source of substantially fixed voltage on the blacker than black side of said datum voltage, a first unilaterally conductive device having an anode electrode and a cathode electrode, means connecting the anode-cathode path of said first device from said signal source to the other end of said load, a second unilaterally conductive device having an anode electrode and a cathode electrode, means connecting the anode-cathode path of said second device from said voltage source to said other end of said load, and means for rendering said first device conducting and said second device nonconducting for some intervals and for rendering said first device nonconducting and said second device conducting for other intervals, whereby said load alternately receives video signals from said signal source via said first unilaterally conductive device and synchronizing pulses determined in amplitude by said voltage source via said second unilaterally conductive device.

5. In television apparatus including a source of video signals having signals corresponding to black stabilized at a datum voltage, means for interspersing synchronizing pulses in said video signals, said means comprising an output impedance connected at one end to a point of said datum voltage, a source of a normally fixed voltage on the blacker than black side of said datum voltage, a normally conducting unilaterally conductive device having an anode electrode and a catode electrode, means connecting the anode-cathode path of said first device from said signal source to the other end of said impedance, a normally nonconducting unilaterally conductive device having an anode electrode and a cathode electrode, means connecting the anode-cathode path of said second device from said voltage source to said other end of said impedance, means for switching said first unilaterally conductive device to a nonconducting state during recurrent intervals, and means for switching said second unilaterally conductive device to a conducting state during intervals of shorter duration than and occurring wholly within said first intervals, whereby said impedance alternately receives video signals via said first unilaterally conductive device and synchronizing pulses of determined amplitude via said second unilaterally conductive device with suppression intervals between said signals and said pulses during which the output from said impedance is a voltage of said datum level.

References Cited in the file of this patent

UNITED STATES PATENTS

| | | |
|---|---|---|
| 2,244,239 | Blumlein et al. | June 3, 1941 |
| 2,252,613 | Mayle | Aug. 12, 1941 |
| 2,258,732 | Blumlein et al. | Oct. 14, 1941 |
| 2,266,194 | Guanella | Dec. 16, 1941 |
| 2,298,863 | Bartelink | Oct. 13, 1942 |
| 2,300,999 | Williams | Nov. 3, 1942 |
| 2,366,358 | Schlesinger | Jan. 2, 1945 |
| 2,490,561 | Ussler | Dec. 6, 1949 |
| 2,513,910 | Bliss | July 4, 1950 |
| 2,570,431 | Crosby | Oct. 9, 1951 |

FOREIGN PATENTS

| | | |
|---|---|---|
| 455,858 | Great Britain | Oct. 26, 1936 |